United States Patent
Yu et al.

(10) Patent No.: US 8,365,015 B1
(45) Date of Patent: Jan. 29, 2013

(54) MEMORY-BASED ERROR RECOVERY

(75) Inventors: Shu-Yi Yu, Sunnyvale, CA (US); Shane Keil, San Jose, CA (US); John Edmondson, Arlington, MA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 12/853,121

(22) Filed: Aug. 9, 2010

(51) Int. Cl.
G06F 11/00 (2006.01)
(52) U.S. Cl. .............. 714/16; 714/17; 714/19
(58) Field of Classification Search .......... 714/16, 714/17, 19
See application file for complete search history.

(56) References Cited

U.S. PATENT DOCUMENTS

| | | | |
|---|---|---|---|
| 5,127,014 | A | 6/1992 | Raynham |
| 5,134,616 | A | 7/1992 | Barth, Jr. et al. |
| 6,625,756 | B1 * | 9/2003 | Grochowski et al. ........ 714/17 |
| 7,340,668 | B2 | 3/2008 | Klein |
| 7,428,687 | B2 | 9/2008 | Klein |
| 7,616,209 | B1 | 11/2009 | Molnar et al. |
| 7,844,876 | B2 * | 11/2010 | Wyatt et al. .................. 714/745 |
| 2004/0153763 | A1 * | 8/2004 | Grochowski et al. ........ 714/17 |
| 2008/0022186 | A1 | 1/2008 | Co et al. |

OTHER PUBLICATIONS

Retry. Siewiorek and Swarz, Reliable Computer Systems, Design and Evaluation, 3rd Ed., p. 200.
Rollback recovery. Siewiorek and Swarz, Reliable Computer Systems, Design and Evaluation, 3rd Ed., p. 81.

* cited by examiner

*Primary Examiner* — Charles Ehne
(74) *Attorney, Agent, or Firm* — Clise, Billion & Cyr, P.A.; Richard E. Billion

(57) ABSTRACT

The present disclosure provides memory level error correction methods and apparatus. A memory controller is intermediate the memory devices, such as DRAM chips or memory modules, and a processor, such a graphics processor or a main processor. The memory controller can provide error correction. In an example, the memory controller includes a buffer to store instructions and data for execution by the controller and a replay buffer to store the instructions such that operations can be replayed to prior state before the error. An error detector receives data read from the memory devices and if no error is detected outputs the data. If an error is detected, the error detector signals the memory controller to replay the instructions stored in the replay buffer.

19 Claims, 5 Drawing Sheets

MEMORY-BASED ERROR RECOVERY

FIELD OF THE INVENTION

This invention relates to the field of error correction in memory devices, and more specifically to a method and apparatus of error correction at the memory device level.

BACKGROUND OF THE INVENTION

A memory device is used to store data or representations of data for recall at a later time. Errors produced when reading information representing data or produced when the stored data is recalled or read back are very undesirable. One of the main goals of any memory device is to receive the same data back as was written to the memory device. To help achieve one of the main goals, errors are detected so that a read back or recall operation can be retried or corrected.

SUMMARY OF THE INVENTION

The present invention provides memory system that includes a plurality of memory devices, a memory controller, and an error detector. The memory controller is in communication with an external device and the plurality of memory devices. The memory controller includes an input buffer to receive instructions and data from an external device and a replay buffer to store executed instructions. The error detector receives data read from the memory devices and performs error correction on the data from memory devices. The error detector outputs an error indictor to the memory controller to cause the memory controller to replay instructions stored in the replay buffer.

BRIEF DESCRIPTION OF THE DRAWINGS

Example embodiments are illustrated by way of example and not limitation in the figures of the accompanying drawings, in which like references indicate similar elements.

DETAILED DESCRIPTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
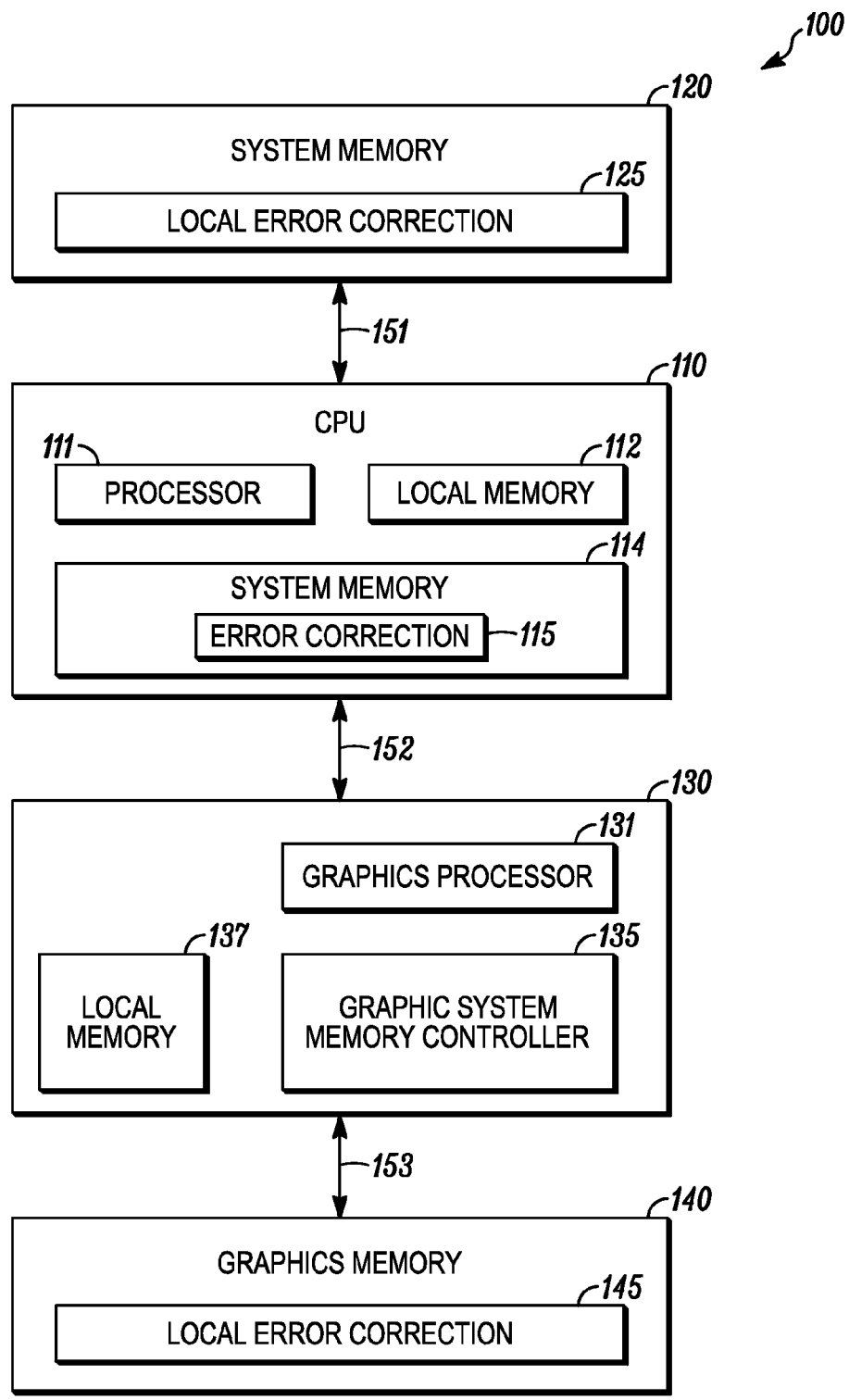
FIG. 1 shows a computing system including a memory.

FIG. 1 is a block diagram of a computer system 100 implementing error correction according to at least one embodiment. System 100 contains central processor unit 110, a system memory 120, a graphics processor unit 130, and graphics memory 140. The central processor unit 110 can include a processor 111 that executes instructions to transform data into other useful data. Examples of processors are Intel® XEON processors, Intel® Core™ vPro processors, Intel® Atom™ Processors or other processors by the Intel Corp. of Santa Clara, Calif. and AMD Phenom™ processors and AMD Athlon™ by AMD of Sunnyvale, Calif. Other examples of processors can include programmable logic controllers, application specific integrated circuits, etc. The central processor 110 can include a local memory 112, such as a cache or buffer to provide fast access to data and instructions to the processor 111.

A system memory controller 114 is associated with the processor 111 to control the communication of data and instructions to the system memory 120 and the receipt of data from the system memory 120. In an example, the system memory controller 114 and the processor 111 are on the chip or die. Memory controller 114 includes the logic circuits necessary to read from and to write to dynamic random access memory (DRAM). The logic circuits can include multiplexers to output the correct row and column address on a reduced number of lines on a bus to the DRAM. As data can include errors, the system memory controller 114 includes an error correction module 115. The error correction can be executed instructions or hard coded into the error correction 115. Examples of error correction include a parity, checksum, Hamming, SECDED Hamming, Reed-Muller, Reed-Solomon, among others, including turbo codes, LDPC codes, repeat-accumulate codes, space time codes, factor graphs, soft-decision decoding, Guruswami-Sudan decoding, EXIT charts, and iterative decoding. The error correction module 115 detects errors as they arrive at the processor 110, e.g., at a different chip than the memory storing large amounts of data. As result, when an error is detected by the error correction module 115, valuable clock cycles must be used to request the data again from the memory, e.g., system memory 120.

The system memory 120 can include volatile and non-volatile memory. Examples of volatile memory include dynamic random access memory (DRAM), double data rate DRAM, Burst EDO (BEDO) DRAM, multibank DRAM, synchronous graphics RAM (SGRAM), synchronous dynamic RAM (SDRAM), single data rate (SDR) DRAM, double data rate (DDR) DRAM, Rambus DRAM, etc. Examples of non-volatile memory include flash (NOR or NAND) memory, electrically erasable PROMs, and Magnetoresistive Random Access Memory. While shown as a single block in FIG. 1, it will be understood that system memory can include a plurality of memory chips that each includes megabytes, gigabytes or greater of storage. The system of memory 130 can be replicated and include multiples of itself. The system memory 120 can be on a separate chip from the processor 111. Local error correction module 125 can be at the system memory, e.g., on the same chip as the memory controller module. Local error correction module 125 can execute the error correction described herein. According to an embodiment of the present invention, the local error correction module 125 can provide error correction at the system memory level. This can remove the communication from the processor unit 110 for some error correction.

The graphic processor unit 130 includes a graphics processor 131 that can be dedicated to processing graphics data. In some examples, the graphics processor 131 is not limited to only processing graphics data. In an example, the graphics processor 131 can be a processor marketed by NVIDIA Corp. of San Jose, Calif., e.g., GeFORCE™, Quadro™ branded processors. The graphics processor can also be a processor that is part of the NFORCE™ chipset by NVIDIA Corp. of Santa Clara, Calif. A graphics system memory controller 135 can be positioned at the same location or part of the same chip as the processor. Graphics system memory controller 135 can include error correction as described herein. A local memory 137 is provided to supply the graphics processor 131 with data in an example. In a further example, the graphics processor 131 uses the graphics memory 140 as the working memory. In operation the graphics processor converts the data into a graphic signal for display on viewing device.

Graphics memory 140 is to provide data to the graphics processor unit 130. The graphics memory 140 can include multiple memory chips that are arranged in banks According to an embodiment of the present invention, graphics memory includes a local error correction module 145, which is to provide error correction at the graphic memory level. This can remove the communication from the graphics processor unit 130 for some error correction.

An interconnect 151 couples the central processor 110 to the system memory 120. An interconnect 152 couples the central processor 110 to the graphics processor 130. An interconnect 153 couples the graphics processor 130 to the graphics memory 140. While shown as separate interconnects 151-153, it will be recognized that one or more of these interconnects can be part of a bus. Each interconnect includes a plurality of electrical communication lines that move data and instructions, including addresses, between the respective devices. The interconnects 151-153 can further provide direct memory access, which can allow a computing system that uses the present embodiment the ability to provide data that is subject to the error correction described herein to and between other devices, for example, disk drive controllers, graphics cards, network cards and sound cards. Direct memory access along interconnected 151-153 can allow intra-chip data transfer between processors, e.g., in multiprocessor system-on-chips or multiprocessor systems.

While shown as separate memories, the system memory 120 and the graphics memory 140 can each store different types of data. For example, if the graphics memory 140 is full or close to being full, the system memory 120 can store graphic data and vice versa.

Figure 2:
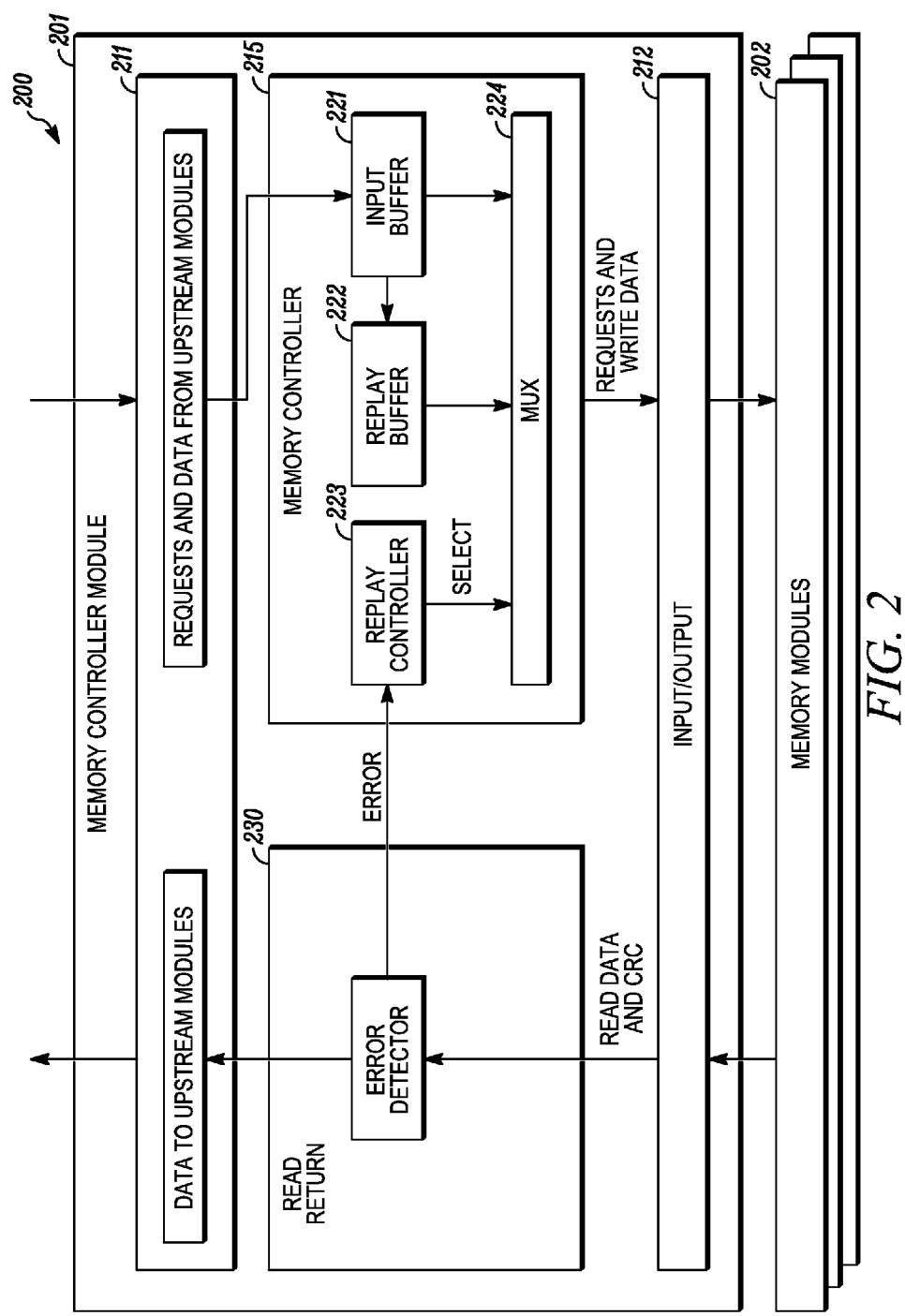
FIG. 2 is schematic view of a memory device.

FIG. 2 is a schematic view of a memory system 200 having error correction according to an embodiment of the present invention. In an example, memory system 200 represents a detailed Memory system 200 includes a memory controller module 201 coupled to a plurality of memory modules 202. The memory controller module 201 can act as a frame buffer for the graphic processing unit. The memory modules 202 can each include a plurality of memory chips that can each store addressable data locations. Examples of the memory include dynamic memory devices such as DRAM and can be DDR DRAM or GDDR DRAM, which is typically used only for graphics applications. The memory controller module 201 includes two input/output modules 211, 212. The first I/O module 211 receives requests from devices or modules external to the memory system 200, e.g., graphics processing unit 130 or processing unit 110, and outputs the resulting data to the requesting device or module. The second I/O 212 is a local I/O that interfaces the memory controller 210 to the memory modules 202.

A memory controller 215 operates to transfer the instructions, commands or requests received via the I/O module 211 to the appropriate memory location in the memory module 202. The memory controller 215 includes an input buffer 221 that can store the requests, instructions and data from the upstream devices and modules. The memory controller 215 executes these stored instructions through a controller output module 224 to the I/O module 212. The controller output module 224 can be a multiplexer. A replay buffer 222 is provided and stores a duplicate of the instruction executed from the input buffer 221. In an example, the instruction is copied to the replay buffer 222 on execution. In an example, the instruction is copied to replay buffer 222 upon receipt in the input buffer 221. The memory controller further includes a replay controller 223 that controls whether instructions from the input buffer 221 or the replay buffer 222 are output to the memory modules 202. Stated another way, the replay controller selects via the output module 224 which buffer 221 or 222 can output instructions from the memory controller 215. In an example, the replay controller 223 is to receive an error detected signal and trigger an output based on a replay of the previously executed instructions, which are stored in the replay buffer 222. The replay controller 223 signals the output module 224 to transmit the instructions from the replay buffer 222 and not the input buffer 221. The input buffer 221 stores incoming instructions until the replay operation is complete. The replay buffer 222 goes back to its checkpoint, e.g., the first in storage location and sequentially executes the previously executed instructions. The replay buffer 222 executes all stored instructions from a checkpoint onward. After all replay instructions are executed, the replay buffer 222 can be erased and new instructions written therein.

When data is read from the memory modules 202, it is sent through I/O module 212 to an error detector 230. The error detector 230 applies an error detection scheme on the data flowing therethrough before being transmitted from the memory system 200 upstream to an external device, e.g., processor 110 or 130 of FIG. 1. In an example, the error detector 230 can perform a checksum error detection on the data. It will be recognized that other error detection schemes can be used in the error detector 230. The error detector 230 can be a module that includes hardware and/or circuits executing instructions. The error detector 230 is in communication with the replay controller 223 to indicate that an error has been detected and the replay controller 223 should trigger a roll back to prior instructions and replay those instructions in an attempt to correct the error.

The error detector 230, the replay controller, 223, the replay buffer 22, the input buffer 221, and the output module 224 can each be a part of a local error correction device, e.g., error correction 125 or 145 as shown in FIG. 1.

The error recovery as described above with regard to the memory system 200 can act with a single memory system while other memory systems in the computing system can continue to perform memory operations. This will reduce the downtime of the device, e.g., the processor, when a memory error occurs and the memory device itself triggers and performs the error recovery operation.

Figure 3:
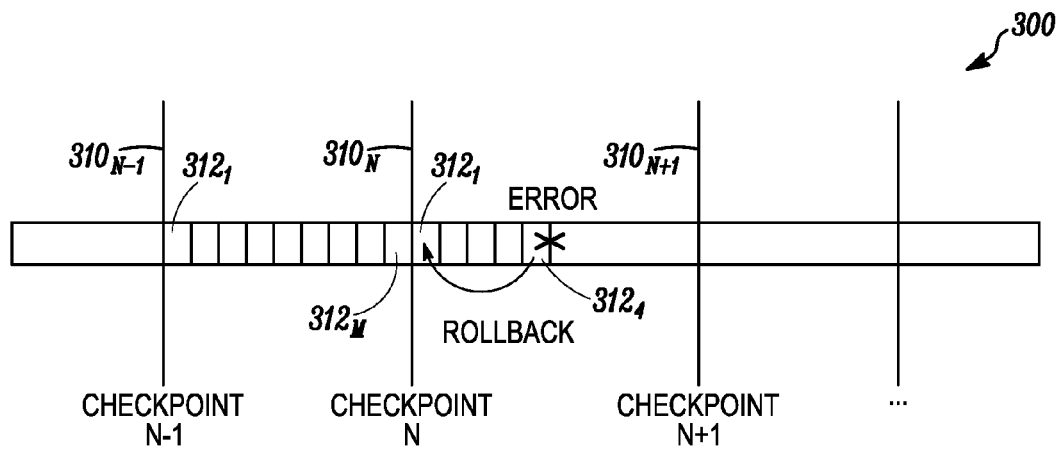
FIG. 3 is a schematic view of replay scheme for the memory.

FIG. 3 is a schematic view of a replay scheme 300 that is executable according to an embodiment. Replay scheme 300 is shown with a plurality of checkpoints $310_{N-1}$, $310_N$, $310_{N+1}$ at select intervals between a plurality of storage locations $312_1$-$312_M$. As shown the number of storage locations 312 is shown as nine but can be any number supported by the memory hardware. In an example, the number of storage locations 312 is equal to $2^N$, with N being an integer greater than six. Each storage location 312 stores a instruction and associated data received in memory device from an external device, e.g., further memory controller or other processing device. The instruction and associated data can be first stored in the input buffer (FIG. 2 and FIG. 4) and then copy to the storage locations 312. The replay scheme 300 can be executed using a first in, first out buffer, see e.g., buffer 400 of FIG. 4. When an error is detected, e.g., after the instruction stored in $312_4$, the instructions stored in the replay buffer are issued again. In the illustrated example, the instructions to be carried out go to the first storage location $312_1$ and then progress to the last instruction stored in the replay buffer, e.g., instruction stored in location $312_4$ in the illustrated example. In an example, when the replay issues a rollback instruction to reexecute the stored instructions, the replay scheme 300 will halt loading any further instructions into the storage locations. In the meantime, new instructions and data may be arriving to the memory unit. These new instructions and data are stored in the input buffer (see FIG. 2.) Once the last instruction, e.g., the instruction stored in location $312_4$, is executed and no further error is detected, then the storage locations can be erased and reused to store new instructions from the input buffer, from which instructions are now executed.

In a further embodiment, when the storage locations $312_1$-$312_M$ are full, then the data stored therein is erased and a new checkpoint is started by storing new instructions and data in the storage locations $312_1$-$312_M$. In a modified embodiment, the storage locations $312_1$-$312_M$ are erased when a command or instructions stored therein is returned from the memory devices without a sensed error. A further buffer can track a pointer that points to the storage location that is awaiting a return of data from the memory devices.

In a further embodiment, the replay buffer 300 can store a plurality of checkpoints $310_{N-1}$, $310_N$, $310_{N+1}$. As a result, error correction can replay to a choice of more than one location.

In one embodiment, only requests within the same bank are replayed. This is to correct single errors. By replaying only one bank, it reduces the replay time based on a single error assumption. Accordingly, the other memory banks can continue to perform memory operations.

In another embodiment of the replay scheme, resend requests from more than one of the banks is received. Replays can then be executed for the multiple banks This replay scheme tolerates multiple errors in multiple banks.

Figure 4:
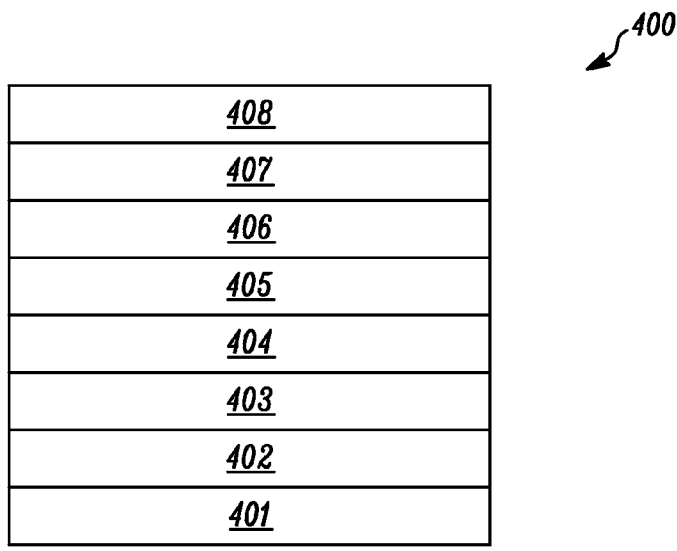
FIG. 4 is a schematic view of a replay buffer of the memory device.

FIG. 4 is a schematic view of replay buffer 400 for the memory unit. Buffer 400 is a stack of sequential storage locations 401-408 that can store any instruction and associated data that need be executed on the memory unit. The storage locations 401-408 can be 32 or 64 bits wide and store and address, a command or instruction. Examples of the commands or instructions can be read, write, erase, refresh, verify. The storage locations can also store error correction codes.

Figure 5:
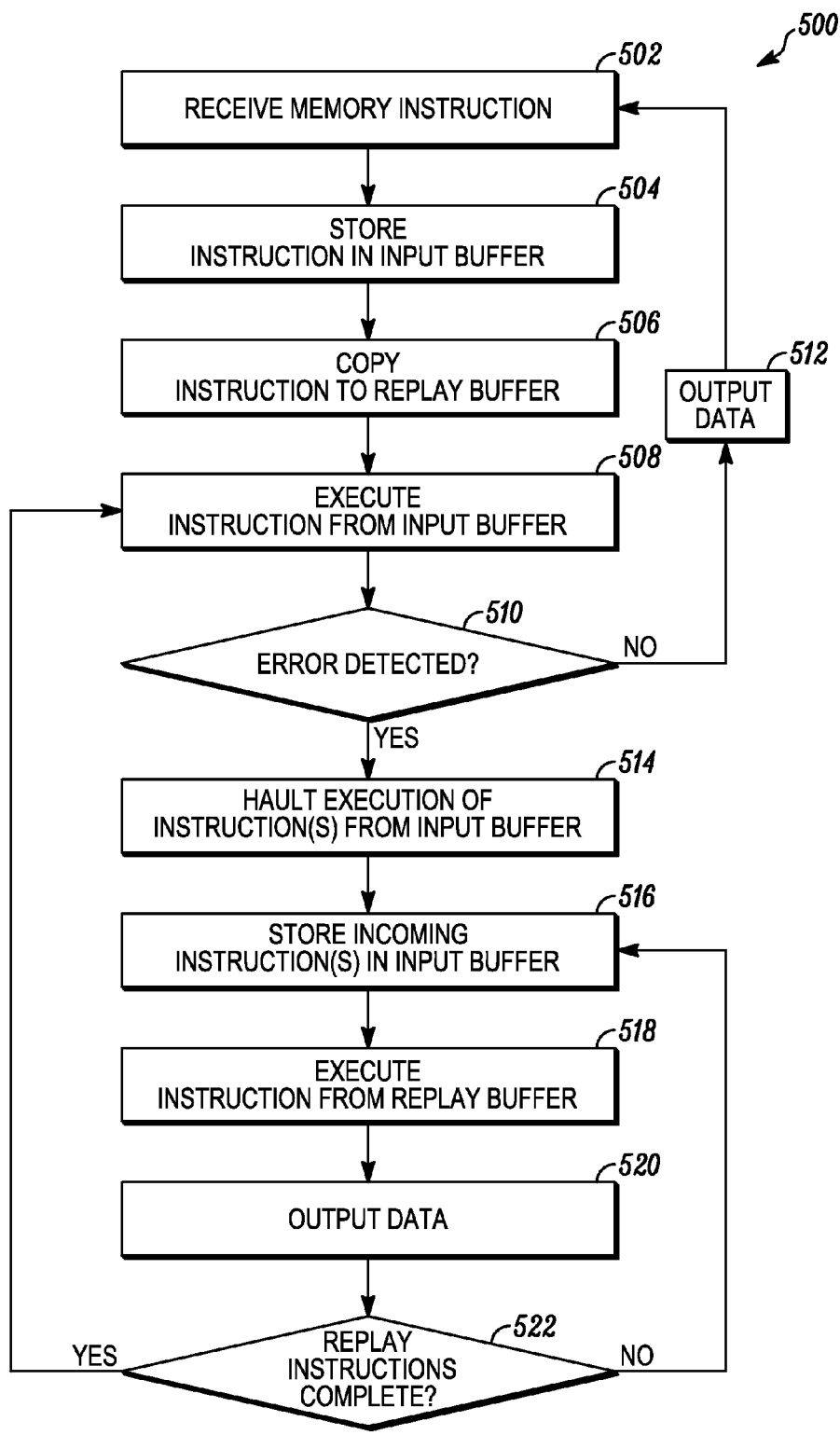
FIG. 5 is a flow chart of an error correction method.

FIG. 5 is a flow chart of an error correction method 500. At 502, instructions are received at the memory system. At 504, the instructions are stored in an input buffer. At 506, the instructions are copied to a replay buffer. At 508, the instructions are executed from the input buffer. While shown as executing after storing in the replay buffer, i.e., 506 first then 508, it will be recognized that these steps can occur at the same time or storing 506 after executing 508. An error detection function occurs on data. In an example, the error detection 510 is performed on the data read from memory banks. If no error is detected, the data is output 512 and the method 500 returns to 502. If an error is detected at 510, then execution of instruction(s) from the input buffer is stopped. At 516, further new instructions received at the memory system, are stored in the input buffer. At 518, instructions stored in the replay buffer, e.g., back to a checkpoint, are executed. In an example, the replay instructions are in the same order as they were originally executed. At 520 the replay data is output. In an example, the data resulting from the replay instruction(s) is also subject to the error detection. At 522, a determination of whether the replay instructions are complete is made. If the replay instructions are complete, then the method 500 returns to 508 and executes the instructions stored in the input buffer. If the replay instructions are not complete, e.g., all instructions in the replay buffer have not been re-executed, then the method 500 returns to 516 and continues to store incoming instructions in input buffer and execute instruction(s) from the replay buffer 518.

While the method 500 shows a specific sequence of steps, it will be recognized in modern computing systems that some of these steps can occur at the same time or in different sequences. For example, data can be read and output at the same time new instructions are being received and stored.

The method 500 continues step 518 until all instructions stored in the replay buffer are executed. In another example, the replay buffer may store instructions that are not the most recent checkpoint or roll back point. In this example, the replay instructions are executed from the most recent checkpoint to the most recently executed instruction by the input buffer, which is the newest instruction in the replay buffer.

Figure 6:
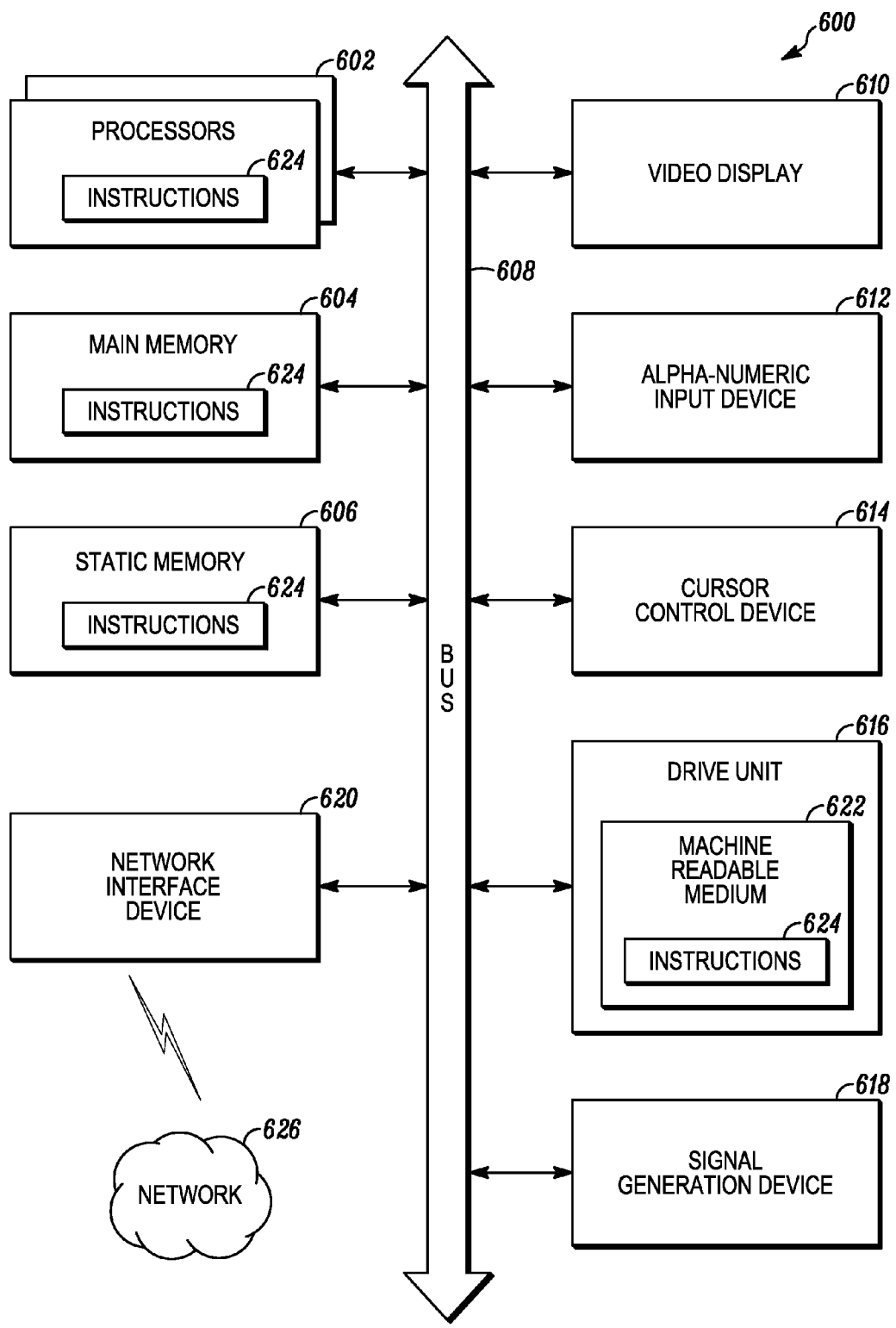
FIG. 6 is a diagrammatic representation of an example machine in the form of a computer system.

FIG. 6 shows a diagrammatic representation of a computing device for a machine in the example electronic form of a computer system 600, within which a set of instructions for causing the machine to perform any one or more of the error correction methodologies discussed herein can be executed or is adapted to include the apparatus for error correction as described herein. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 602 (e.g., a central processing unit (CPU), a graphics processing unit (GPU), arithmetic logic unit or all), and a main memory 604 and a static memory 606, which communicate with each other via a bus 608. The computer system 600 can further include a video display unit 610 (e.g., a liquid crystal displays (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a computer-readable medium 622 on which is stored one or more sets of instructions and data structures (e.g., instructions 624) embodying or utilized by any one or more of the methodologies or functions described herein. The instructions 624 can also reside, completely or at least partially, within the main memory 604 and/or within the processors 602 during execution thereof by the computer system 600. The main memory 604 and the processors 602 also constitute machine-readable media.

The instructions 624 can further be transmitted or received over a network 626 via the network interface device 620 utilizing any one of a number of well-known transfer protocols (e.g., Hyper Text Transfer Protocol (HTTP), CAN, Serial, or Modbus).

While the computer-readable medium 622 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. Modules as used herein can be hardware or hardware including circuitry to execute instructions. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method(s) can be written in any number of suitable programming languages such as, for example, Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

The presently described structures and devices can be implemented in a system on a chip configuration with the memory devices and the processor being on the same chip. The system on a chip can use less power as well as having a lower cost and higher reliability than some multi-chip systems. Assembly costs can also be reduced as there are fewer packages in the system. The structures and devices can also be part of a system in a package where the memory devices and the processor are integrated in a single package.

The present inventors note that typical rollback schemes that utilize the central memory controller and processor to perform error correction have significant drawbacks such as large chip real estate penalties and lack of storage space so check points cannot be stored too frequently. Moreover, there is a time overhead when halting the entire system to replay all of the stored instructions on a system level, e.g., when a retry is done at the system level, it is difficult to reschedule only the few transactions needed to correct the error. Stated another way, disadvantages noted by the present inventors include large latency and costly area for massive-scale (system wide) retry and checkpoint storage. The present inventors invented the unexpected and beneficial methods and structures described herein to move some error correction function out to the memory. This reduces the real estate penalty at the chipset or mother board and moves some error correction function to the memory level. The error correction at the memory can trigger a replay or roll back at the local memory where the error occurs and save clock cycles. Moreover, only instructions at the memory need to be reexecuted.

In an example, the inventors propose a new solution of transaction-scale rollback on systems accessing DRAMs. By placing the replay mechanism close to DRAM where transient errors could happen, especially in high-speed interfaces, we are able to reduce the error detection latency. Also by unitizing the memory structure of DRAMs, replaying subsequent in-flight requests becomes simpler to execute as the replay is localized and prevents the error from propagating to other chips and devices in the system. Stated another way, an embodiment of the invention need only replay transactions accessing the same memory module as where the error was detected. The result is a fast replay mechanism with low latency and small overhead. In the case of GDDR5 DRAMs, the latency of the error correction as described herein can be about 80 nanoseconds or less. This design is not limited to GDDR5, however. The present error correction can also be combined with any other scheme(s) of error detection.

The present disclosure refers to instructions that are received at a memory system. Instructions can include an operational command, e.g., read, write, erase, refresh, etc., an address at which an operational command should be performed, and the data, if any, associated with a command. The instructions can also include error correction data.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. The term "having" if used in the claims is an open ended term. Moreover, in the following claims, the terms "first," "second," and "third," etc. are used merely as labels, and are not intended to impose numerical requirements on their objects.

The use of the term "or" in the present description should be interpreted as a non-exclusive or unless otherwise stated.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It is emphasized that, for purposes of the United States, the Abstract is provided to comply with 36 C.F.R. §1.62(b) requiring an Abstract that will allow the reader to quickly ascertain the nature and gist of the technical disclosure. It is submitted with the understanding that it will not be used to interpret or limit the scope or meaning of the claims.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computing system, comprising:
   a system memory including a local memory controller and memory devices to store data;
   a central processor to execute instructions on data from the system memory;
   a memory controller in communication with the central processor to provide data from the system memory;
   a graphics processor in communication with the central processor, the graphic processor including a graphics memory controller;
   a graphics memory including a local graphics memory controller and graphics memory to store data;
   wherein the local graphics memory controller includes:
      an input buffer to receive instructions and data;
      a replay buffer to store executed instructions; and
      an error detector to receive data read from the graphics memory, the error detector to halt the instructions in the input buffer and trigger the instructions stored in the replay buffer.

2. The computing system of claim 1, wherein the memory controller and the local graphics memory controller each include the input buffer, the replay buffer, and the error detector, respectively.

3. The computing system of claim 2, wherein the local graphics memory controller and its associated error detector are on a same graphic chip, and wherein the local memory controller and its associated error detector are on a same memory chip.

4. The computing system of claim 2, wherein the replay buffer is a first in, first out buffer that stores all instructions and data to a set point.

5. The computing system of claim 4, wherein the set point in the replay buffer is either subsequent to a prior error or at a number of operations prior to a current instruction from an external device.

6. The computing system of claim 1, comprising a replay controller that receives a replay signal from the error detector and switches output from the input buffer to the replay buffer.

7. The computing system of claim 6, wherein the replay controller allows the replay buffer to empty it stored instructions and data before returning memory control to the input buffer.

8. The computing system of claim 1, wherein the input buffer outputs the instruction and data to the memory devices and to the replay buffer.

9. The computing system of claim 1, wherein the error detector only detects data errors from the graphics memory and does not detect instruction execution error.

10. The computing system of claim 1, wherein the central processor comprises one or more of programmable logic controller and application specific integrated circuit.

11. The computing system of claim 1, wherein the system memory comprises volatile memory.

12. The computing system of claim 1, wherein the system memory comprises non-volatile memory.

13. The computing system of claim 11, wherein volatile memory comprises one or more of dynamic random access memory (DRAM), double data rate DRAM, Burst EDO (BEDO) DRAM, multibank DRAM, synchronous graphics RAM (SGRAM), synchronous dynamic RAM (SDRAM), single data rate (SDR) DRAM, double data rate (DDR) DRAM, and Rambus DRAM.

14. The computing system of claim 12, wherein non-volatile system memory comprises one or more of NOR flash memory, NAND flash memory, electrically erasable PROMs and magnetoresistive random access memory.

15. The computing system of claim 1, wherein the memory controller acts as a frame buffer for the graphic processor.

16. The computing system of claim 1, wherein the graphics processor uses the graphic memory as the working memory.

17. The computing system of claim 1, wherein the graphics processor converts the data into a graphic signal for display on a viewing device.

18. The computing system of claim 1, wherein the graphics memory comprises multiple memory chips arranged in banks.

19. The computing system of claim 1, wherein the system memory and graphics memory each store different types of data.

* * * * *